US012784584B2

(12) United States Patent
Yanagisawa et al.

(10) Patent No.: US 12,784,584 B2
(45) Date of Patent: Nov. 3, 2026

(54) COMMUNICATION SYSTEM, COMMUNICATION METHOD, AND STORAGE MEDIUM

(71) Applicant: NEC Corporation, Minato-ku (JP)

(72) Inventors: Kei Yanagisawa, Tokyo (JP); Hiroaki Aminaka, Tokyo (JP); Kosei Kobayashi, Tokyo (JP); Jun Takasawa, Tokyo (JP); Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 18/715,802

(22) PCT Filed: Dec. 16, 2021

(86) PCT No.: PCT/JP2021/046446

§ 371 (c)(1),
(2) Date: Nov. 25, 2024

(87) PCT Pub. No.: WO2023/112238

PCT Pub. Date: Jun. 22, 2023

(65) Prior Publication Data

US 2025/0201115 A1 Jun. 19, 2025

(51) Int. Cl.

*G08G 1/01* (2006.01)
*G08G 1/04* (2006.01)
*G08G 1/052* (2006.01)

(52) U.S. Cl.

CPC ............... *G08G 1/052* (2013.01); *G08G 1/04* (2013.01)

(58) Field of Classification Search

CPC ............. G08G 1/052; G08G 1/04; G08G 1/09
USPC ......................... 340/936, 933, 988, 989, 990
See application file for complete search history.

(56) References Cited

U.S. PATENT DOCUMENTS 9,648,415 B2 * 5/2017 Sakakibara .............. H04R 3/00
2012/0059574 A1 * 3/2012 Hada .................... G08G 1/0112 701/119
2015/0260522 A1 * 9/2015 Lei ......................... G08G 1/052 701/400
2016/0314687 A1 * 10/2016 Koshizen .............. B60W 40/04
(Continued)

FOREIGN PATENT DOCUMENTS

JP 2003-179969 A 6/2003
JP 2004-080420 A 3/2004
JP 2004-206624 A 7/2004
(Continued)

OTHER PUBLICATIONS

JP Official Communication for JP Application No. 2023-567417, mailed on Apr. 22, 2025 with English Translation.
(Continued)

*Primary Examiner* — Anh V La
(74) *Attorney, Agent, or Firm* — Sughrue Mion, PLLC

(57) ABSTRACT

The communication system includes a communication circuit configured to communicate with the vehicle, and a detection circuit configured to detect speed information corresponding to the speed of the vehicle, and on the basis of the speed information, the communication circuit communicates with the vehicle by using a first frequency when the speed is a first speed, and communicates with the vehicle by using a second frequency lower than the first frequency when the speed is a second speed higher than the first speed.

6 Claims, 6 Drawing Sheets

(56) References Cited

U.S. PATENT DOCUMENTS

2017/0263120 A1* 9/2017 Durie, Jr. ............... G08G 1/205

FOREIGN PATENT DOCUMENTS

| | | | |
|---|---|---|---|
| JP | 2005-204218 | A | 7/2005 |
| JP | 2006-345427 | A | 12/2006 |
| JP | 2010-103945 | A | 5/2010 |
| JP | 2011-045032 | A | 3/2011 |
| JP | 2012-015900 | A | 1/2012 |
| JP | 2019-029963 | A | 2/2019 |
| JP | 2019-161378 | A | 9/2019 |

OTHER PUBLICATIONS

International Search Report for PCT Application No. PCT/JP2021/046446, mailed on Mar. 8, 2022.

English translation of Written opinion for PCT Application No. PCT/JP2021/046446, mailed on Mar. 8, 2022.

* cited by examiner

COMMUNICATION SYSTEM, COMMUNICATION METHOD, AND STORAGE MEDIUM

This application is a National Stage Entry of PCT/JP2021/046446 filed on Dec. 16, 2021, the contents of all of which are incorporated herein by reference, in their entirety.

TECHNICAL FIELD

The present invention relates to a communication system and the like that are able to execute a stable communication even when, for example, a vehicle speed is high.

BACKGROUND ART

A road-to-vehicle communication in which communication is performed between a roadside unit provided near a road and a vehicle traveling on the road is known. In the road-to-vehicle communication, for example, a vehicle transmits own vehicle information to the roadside unit and the roadside unit recognizes a surrounding situation and transmits information to another vehicle traveling nearby, and thereby a driver can be alerted and prevent a collision accident. Further, a vehicle-to-vehicle communication in which communication is performed between vehicles is known. In the vehicle-to-vehicle communication, for example, at an intersection with poor visibility, the vehicles wirelessly transmit and receive, to and from each other, own vehicle information such as a position or a speed thereof, and thereby a driver can be warned and prevent a collision accident. Further, in a general road-to-vehicle communication or vehicle-to-vehicle communication, a vehicle can receive information such as a surrounding traffic situation or an advertisement, and can provide the information to a vehicle occupant.

For example, PTL 1 as a reference technique discloses that a radio transmission device mounted on a moving body such as a traveling vehicle reduces influence of a Doppler shift by giving a radio signal being transmitted a frequency shift being set based on a speed of the moving body.

Further, PTL 2 discloses that a vehicle-mounted radio terminal switches radio communication schemes having different frequency bands used.

CITATION LIST

Patent Literature

PTL 1: Japanese Unexamined Patent Application Publication No. 2006-345427

PTL 2: Japanese Unexamined Patent Application Publication No. 2004-080420

SUMMARY OF INVENTION

Technical Problem

However, in a general road-to-vehicle communication or vehicle-to-vehicle communication and techniques described in PTLs 1 and 2, a signal for use in communication is transmitted from a communication device such as a base station, a roadside unit, or a vehicle to a vehicle. Thus, in order to perform a stable communication, a vehicle preferably travels within a range (cell) where a signal from the communication device can reach for a certain period of time. However, in the above-described technique, when a vehicle speed is high, the vehicle moves through a plurality of cells for a short period of time, and thus, a stable communication cannot be performed.

In view of the above-described problem, an object of the present invention is to provide a communication system and the like that are able to execute a stable communication even when, for example, a vehicle speed is high.

Solution to Problem

The present invention is a communication system including:

- a communication means for communicating with a vehicle; and
- a detection means for detecting speed information associated with a speed of the vehicle, wherein,
- based on the speed information, the communication means
  - communicates with the vehicle by using a first frequency when the speed is a first speed, and
  - communicates with the vehicle by using a second frequency lower than the first frequency when the speed is a second speed higher than the first speed.

Further, the present invention is a communication method including:

- detecting speed information associated with a speed of a vehicle;
- communicating with the vehicle by using a first frequency when the speed based on the speed information is a first speed; and
- communicating with the vehicle by using a second frequency lower than the first frequency when the speed based on the speed information is a second speed higher than the first speed.

Further, the present invention is a storage medium storing a program causing an information processing device to execute:

- processing of detecting speed information associated with a speed of a vehicle;
- processing of communicating with the vehicle by using a first frequency when the speed based on the speed information is a first speed; and
- processing of communicating with the vehicle by using a second frequency lower than the first frequency when the speed based on the speed information is a second speed higher than the first speed.

Advantageous Effects of Invention

According to the present invention, it is possible to execute a stable communication even when, for example, a vehicle speed is high.

EXAMPLE EMBODIMENT

First Example Embodiment

Figure 1:
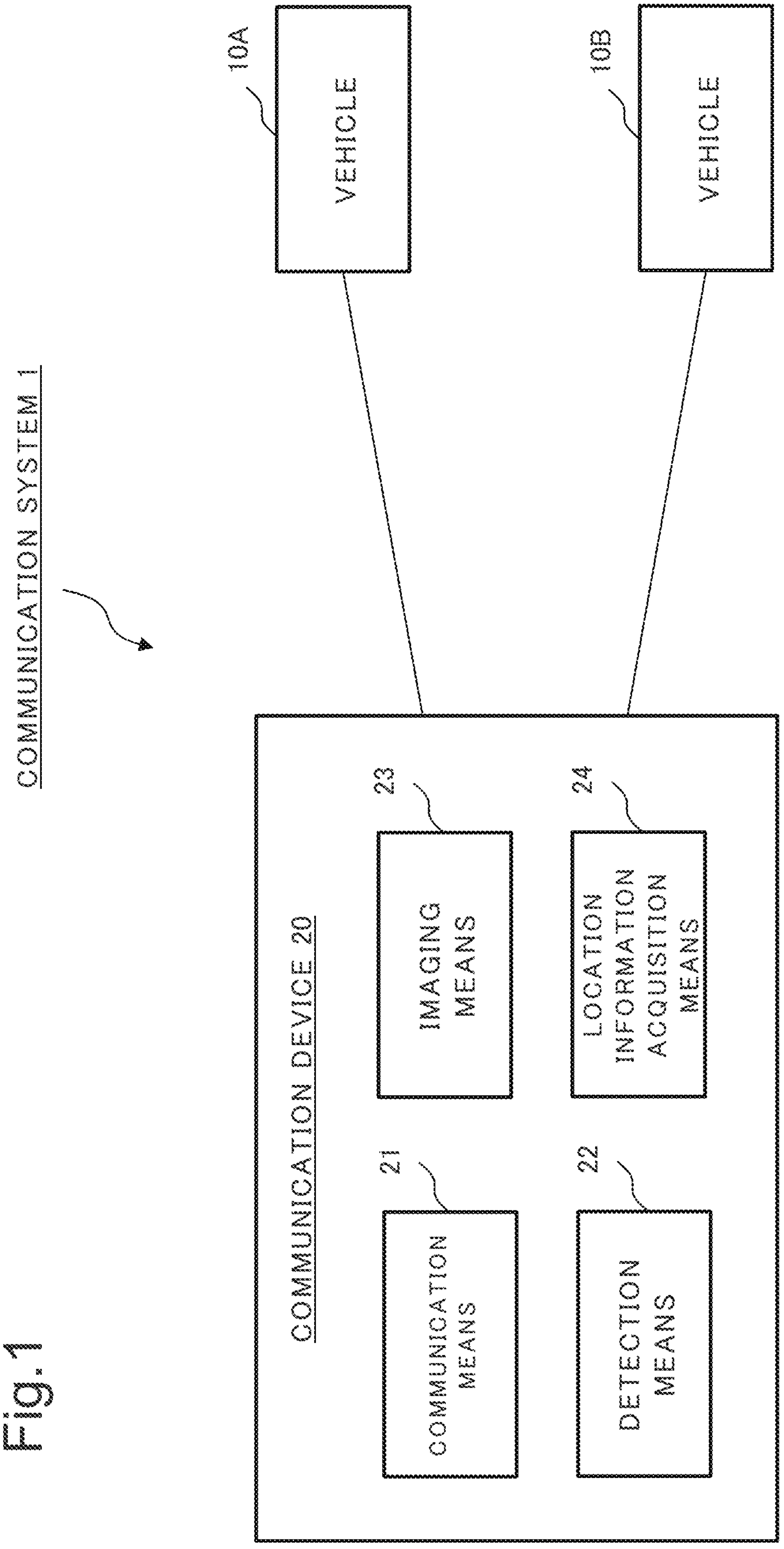
FIG. 1 is a block diagram illustrating a configuration example of a communication system according to a first example embodiment of the present invention.
Figure 2:
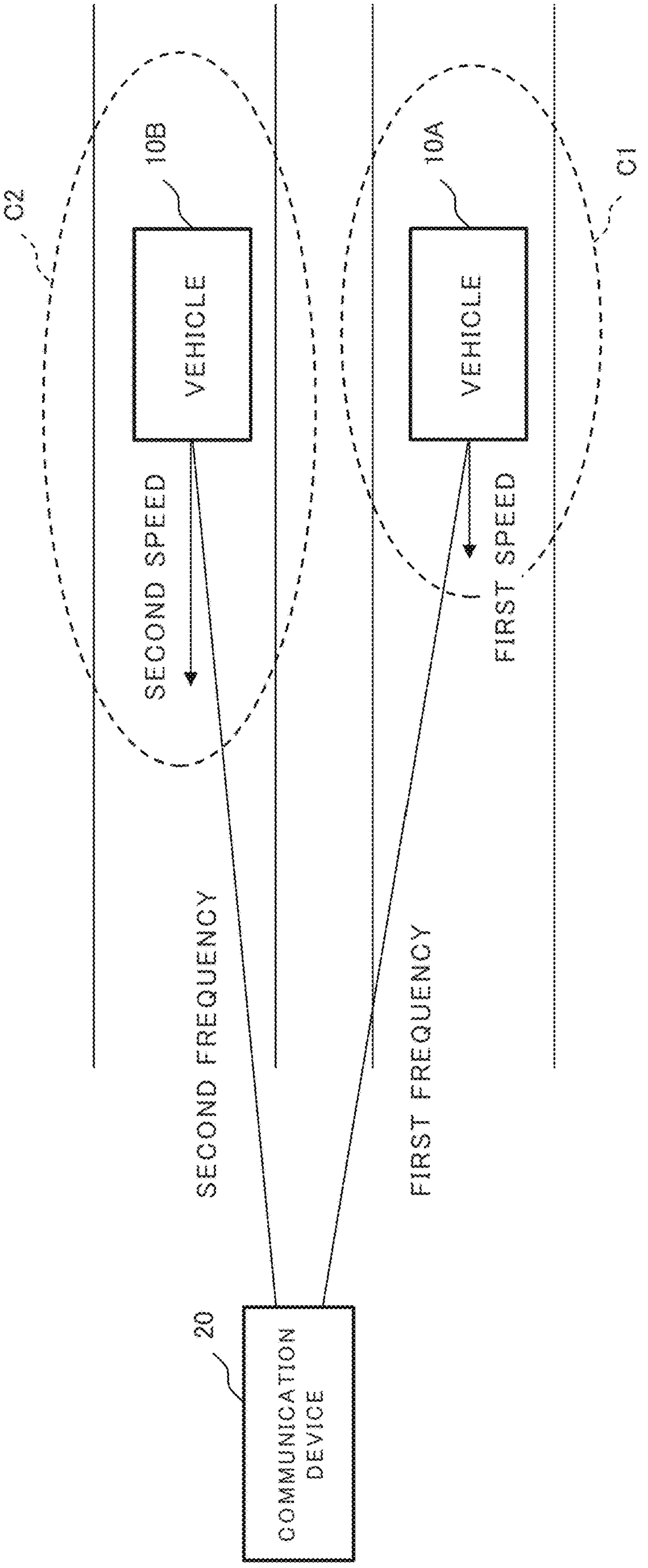
FIG. 2 is a diagram for describing a detail of the communication system according to the first example embodiment of the present invention.
Figure 3:
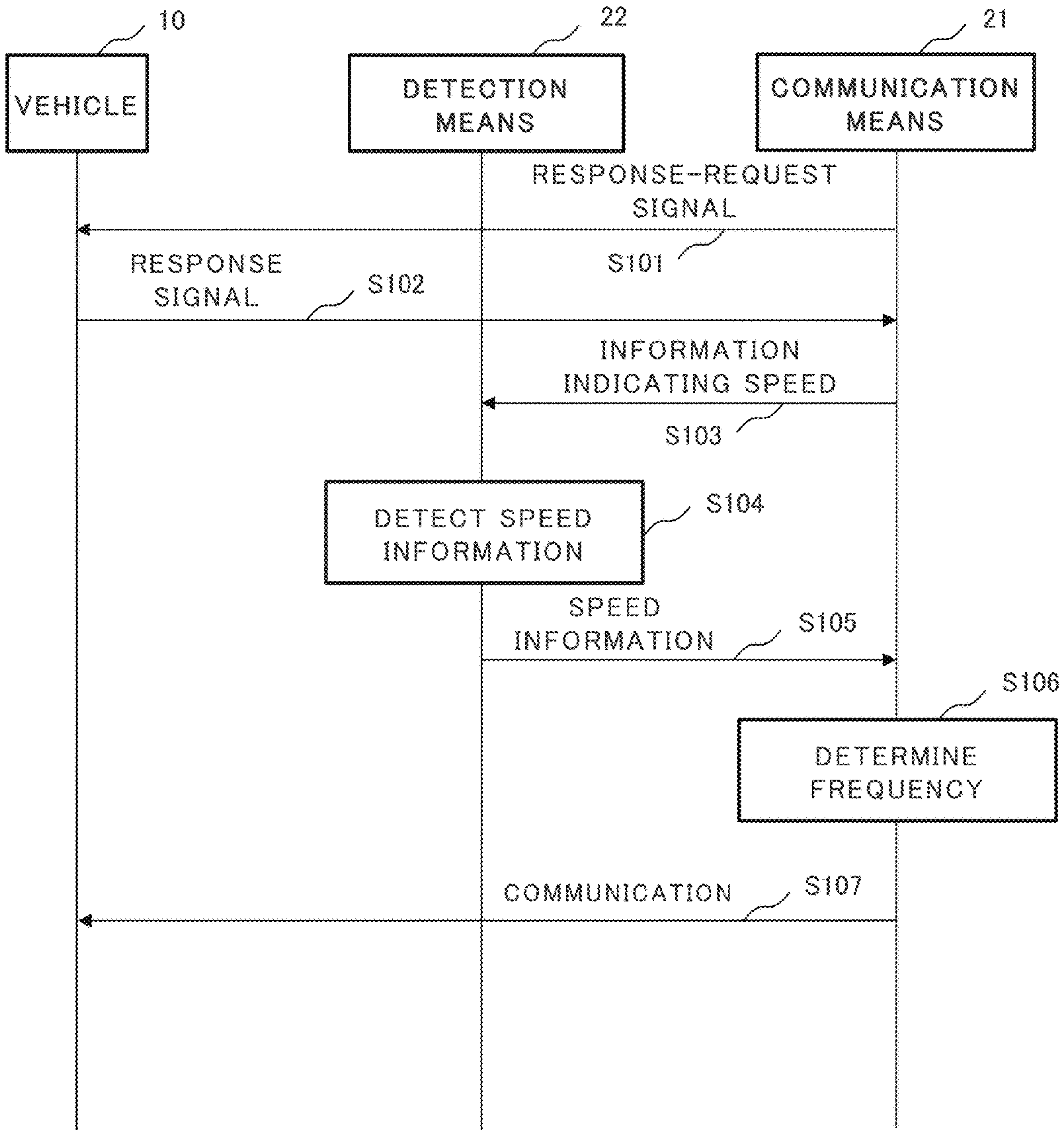
FIG. 3 is a flowchart illustrating an operation example of the communication system according to the first example embodiment of the present invention.

A communication system 1 according to a first example embodiment will be described based on FIGS. 1, 2, and 3. FIG. 1 is a block diagram illustrating a configuration example of the communication system 1. FIG. 2 is a diagram for describing a detail of the communication system 1. FIG. 3 is a flowchart diagram for describing an operation example of the communication system 1.

The communication system 1 includes vehicles 10A and 10B and a communication device 20. In the following description, when it is not necessary to distinguish between the vehicles 10A and 10B, each of the vehicles 10A and 10B will be referred to as a vehicle 10 in the following description.

The vehicle 10 is a vehicle capable of traveling, and includes a vehicle-mounted device capable of wireless communication. The vehicle 10 communicates with the communication device 20 by using the vehicle-mounted device included within the vehicle 10. In other words, the vehicle 10 is communicably connected to the communication device 20. For communications, a vehicle-to-vehicle communication or road-to-vehicle communication technique such as dedicated short range communications (DSRC), cellular vehicle-to-everything (V2X) (C-V2X), or new radio vehicle-to-everything (V2X) (NR-V2X), a cellular communication technique such as long term evolution (LTE) or 5th generation (5G), and a wireless communication technique such as WiFi (registered trademark) are used. When a communication is performed with 5G, the vehicle 10 can use a frequency band called Sub6 or a millimeter wave.

The communication device 20 includes a communication means 21, a detection means 22, an imaging means 23, and a location information acquisition means 24. The communication device 20 is, for example, a roadside unit provided on a road side on which the vehicle 10 travels. Further, the communication device 20 may be a vehicle-mounted device provided in another vehicle, or may be a smartphone or the like held by a pedestrian walking nearby.

Note that, the communication means 21, the detection means 22, the imaging means 23, and the location information acquisition means 24 may be provided in devices different from one another. Further, it is described in FIG. 1 that the communication system 1 includes the vehicles 10A and 10B, but the vehicles 10A and 10B are not essential configurations of the communication system 1. In other words, the communication system 1 may be configured only by the communication means 21, the detection means 22, the imaging means 23, and the location information acquisition means 24.

The communication means 21, the detection means 22, the imaging means 23, and the location information acquisition means 24 are communicably connected to one another. Further, the communication means 21 is communicably connected to the vehicle 10.

The communication means 21 communicates with the vehicle 10. For example, the communication means 21 transmits/receives, by a communication with the vehicle 10, information indicating establishment of a communication session with a vehicle-mounted device within the vehicle 10, a lighting color state of a neighboring traffic signal, approaching of an emergency vehicle such as an ambulance, an advertisement from a nearby store, a driving assistance message, an alert, and the like.

First, the detection means 22 detects speed information associated with a speed of the vehicle 10. For example, the detection means 22 communicates with the vehicle 10 by a wireless communication such as LTE via the communication means 21. Thereby, the detection means 22 acquires a speed at which the vehicle 10 travels as speed information. Note that, the speed information may indicate, besides a speed at which the vehicle 10 travels, a state of the vehicle 10 associated with a speed such as “high speed”, “low speed”, or “stop”.

Further, secondary, the detection means 22 may acquire, from a traffic signal giving an instruction to the vehicle 10, speed information associated with the instruction. Generally, a traffic signal gives an instruction to a vehicle by varying lighting color. For example, the detection means 22 communicates with the vehicle 10 via the communication means 21, and acquires location information and a traveling direction of the vehicle 10. The detection means 22 stores in advance, for each traffic signal, location information of a traffic signal and a target range of instruction of the traffic signal, and specifies, based on the location information and the traveling direction of the vehicle 10, a traffic signal giving an instruction to the vehicle 10. For example, the detection means 22 specifies a traffic signal a target range of instruction of which includes location information of the vehicle 10 and that is positioned in a direction of approach of the vehicle 10, as a traffic signal giving an instruction to the vehicle 10. Note that, the detection means 22 may acquire location information of a traffic signal and a target range of instruction of the traffic signal from an external server or the like, rather than storing in advance.

The detection means 22 acquires a content of an instruction given by a specified traffic signal to the vehicle 10, and acquires speed information associated with the instruction. Specifically, when a traffic signal instructs the vehicle 10 to stop, the detection means 22 acquires speed information indicating that a speed of the vehicle 10 is zero, or speed information indicating that the vehicle 10 has stopped. Further, when a traffic signal instructs the vehicle 10 to pass, the detection means 22 acquires speed information indicating a legal speed of a road where the traffic signal is provided, or speed information indicating a state (for example, a classification such as “high speed” or “low speed”) of the vehicle 10 associated with the legal speed. In this example, it is assumed that a traffic signal stores in advance a legal speed of a road where the own traffic signal is provided.

Thirdly, the detection means 22 may acquire speed information, based on a video of the vehicle 10 imaged by the imaging means 23. The imaging means 23 has a function of imaging the vehicle 10. The imaging means 23 is, for example, a camera or the like, and is provided within the communication device 20. Note that, the imaging means 23 may be provided in a device different from the communication device 20. In this case, the imaging means 23 transmits an imaged video to the detection means 22 via the communication means 21.

The detection means 22 acquires speed information, based on a video of the vehicle 10. Specifically, the detection means 22 analyzes an amount of movement of the vehicle 10 in a video, and calculates a speed of the vehicle 10. The detection means 22 acquires the calculated speed as speed information. Note that, it is assumed that a known technique is used for video analysis.

Fourthly, the detection means 22 acquires speed information, based on location information of the vehicle 10 acquired by the location information acquisition means 24. In this example, it is assumed that the vehicle 10 acquires location information of a vehicle by, for example, a global positioning system (GPS) or a global navigation satellite system (GNSS). The detection means 22 acquires location information of the vehicle 10 by communicating with the vehicle 10 by a wireless communication such as LTE.

The detection means 22 acquires speed information, based on location information of the vehicle 10. Specifically, it is assumed that the detection means 22 stores in advance an association relationship between location information and speed information in advance. For example, it is assumed that a legal speed of the road present at a position indicated by location information is associated with the location information as speed information. The detection means 22 acquires location information of the vehicle 10, and acquires speed information associated with the location information as speed information of the vehicle 10.

The communication means 21 determines, based on speed information detected by the detection means 22, a frequency for use in communication with the vehicle 10. For example, when the speed information is associated with a first speed (for example, 50 km/h), the communication means 21 communicates with the vehicle 10 by using a first frequency (for example, a millimeter wave in the 28 GHz band). Further, when the speed information is associated with a second speed (for example, 80 km/h) higher than the first speed, the communication means 21 communicates with the vehicle 10 by using a second frequency (for example, Sub6 in the 3.7 GHZ band or the 4.5 GHz band) lower than the first frequency. The above description "speed information is associated with a first speed" specifically means that the speed information indicates the first speed. Alternatively, the above description means that the speed information indicates a state of the vehicle 10 associated with the first speed (for example, a state of the vehicle 10 associated with a speed such as "high speed", "low speed", or "stop").

Next, a detail of the communication system 1 will be described by using FIG. 2. FIG. 2 is a block diagram for describing a detail when a communication is performed between the communication device 20 and the vehicle 10 by using a first frequency and when by using a second frequency.

FIG. 2 illustrates the communication device 20 and the vehicles 10A and 10B. In this example, it is assumed that the vehicle 10A travels at a first speed and the vehicle 10B travels at a second speed higher than the first speed. In this case, the communication device 20 communicates with the vehicle 10A by using a first frequency and communicates with the vehicle 10B by using a second frequency lower than the first frequency, as described above.

Generally, in a wireless communication, a signal with a lower frequency propagates over a wider range than a signal with a higher frequency. Thus, a radio signal with the first frequency propagates in a cell C1, and a radio signal with the second frequency propagates in a cell C2 wider than the cell C1, as illustrated in FIG. 2. Thus, in the communication system 1, a vehicle running at a high speed can communicate by using a radio signal that propagates over a wide cell.

Next, an operation of the communication system 1 will be described by using FIG. 3. FIG. 3 is a flowchart illustrating an operation of the communication system 1.

The communication means 21 transmits a response-request signal toward a vehicle in a predetermined range (S101). Note that, it is assumed that the communication means 21 transmits a response-request signal by using a frequency (for example, the LTE band from 700 to 900 MHz) lower than the above-described first and second frequencies.

The vehicle 10 transmits, to the communication means 21, a response signal in response to reception of the response-request signal (S102). At this time, the vehicle 10 transmits, to the communication means 21, a response signal that includes information indicating a speed of the vehicle 10.

The communication means 21 outputs, to the detection means 22, the information indicating a speed included in the response signal (S103). The detection means 22 detects speed information, based on the information acquired from the communication means 21 (S104). The detection means 22 may detect a speed of the vehicle 10 as speed information, or may detect a state (for example, a classification such as "high speed", "low speed", or "stop") of the vehicle 10 associated with the speed as speed information.

The detection means 22 outputs the detected speed information to the communication means 21 (S105). The communication means 21 determines, based on the speed information, a frequency for use in communication with the vehicle 10 (S106). Specifically, when the speed information is associated with a first speed, the communication means 21 determines to use a first frequency. Further, when the speed information is associated with a second speed higher than the first speed, the communication means 21 determines to use a second frequency lower than the first frequency.

For example, when the speed information indicates a speed equal to or less than a threshold value, the communication means 21 determines to use a millimeter wave in the 28 GHz band. Further, when the speed information indicates a speed exceeding the threshold value, the communication means 21 determines to use Sub6 in the 3.7 GHz band or the 4.5 GHz band.

Further, for example, when the speed information indicates a state of "low speed" or "stop", the communication means 21 determines to use a millimeter wave in the 28 GHz band. Further, when the speed information indicates a state of "high speed", the communication means 21 determines to use Sub6 in the 3.7 GHz band or the 4.5 GHz band.

The communication means 21 communicates with the vehicle 10 by using the determined frequency (S107). The communication means 21 transmits/receives, by a communication with the vehicle 10, information indicating establishment of a communication session using 5G with a vehicle-mounted device within the vehicle 10, a lighting color state of a neighboring traffic signal, approaching of an emergency vehicle such as an ambulance, an advertisement from a nearby store, a driving assistance message, an alert, and the like.

Note that, in the description of the above operation, the detection means 22 detects speed information, based on information included in a response signal. Meanwhile, the detection means 22 may acquire, from a traffic signal giving an instruction to the vehicle 10, speed information associated with the instruction, as described above. Further, the detection means 22 may acquire speed information, based on a video of the vehicle 10 imaged by the imaging means 23. Further, the detection means 22 may acquire speed information, based on location information of the vehicle 10 acquired by the location information acquisition means 24.

As described above, in the communication system 1, based on speed information, the communication means 21 communicates with the vehicle 10 by using a first frequency when a speed of the vehicle 10 is a first speed. Further, the communication means 21 communicates with the vehicle 10 by using a second frequency lower than the first frequency when a speed of the vehicle 10 is a second speed higher than the first speed.

In order to perform a stable communication, a vehicle preferably travels within a range (cell) where a signal from a communication device can reach for a certain period of time, as described above. However, in a related technique, when a vehicle runs at a high speed, the vehicle moves through a plurality of cells for a short period of time, and thus, handover needs to be performed and the vehicle cannot perform a stable communication.

However, in the communication system 1, the vehicle 10 running at a high speed can communicate by using a low-frequency radio signal that propagates over a wide cell. Thus, the communication system 1 can decrease frequency with which the vehicle 10 moves between cells, and thus, the vehicle 10 can perform a stable communication.

Second Example Embodiment

Figure 4:
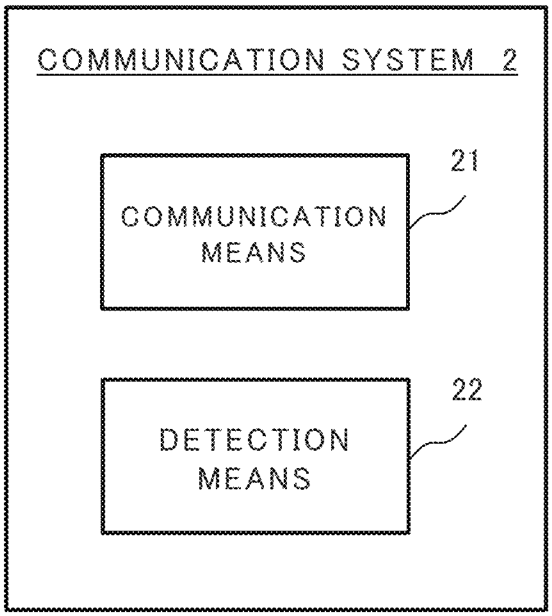
FIG. 4 is a block diagram illustrating a configuration example of a communication system according to a second example embodiment of the present invention.
Figure 5:
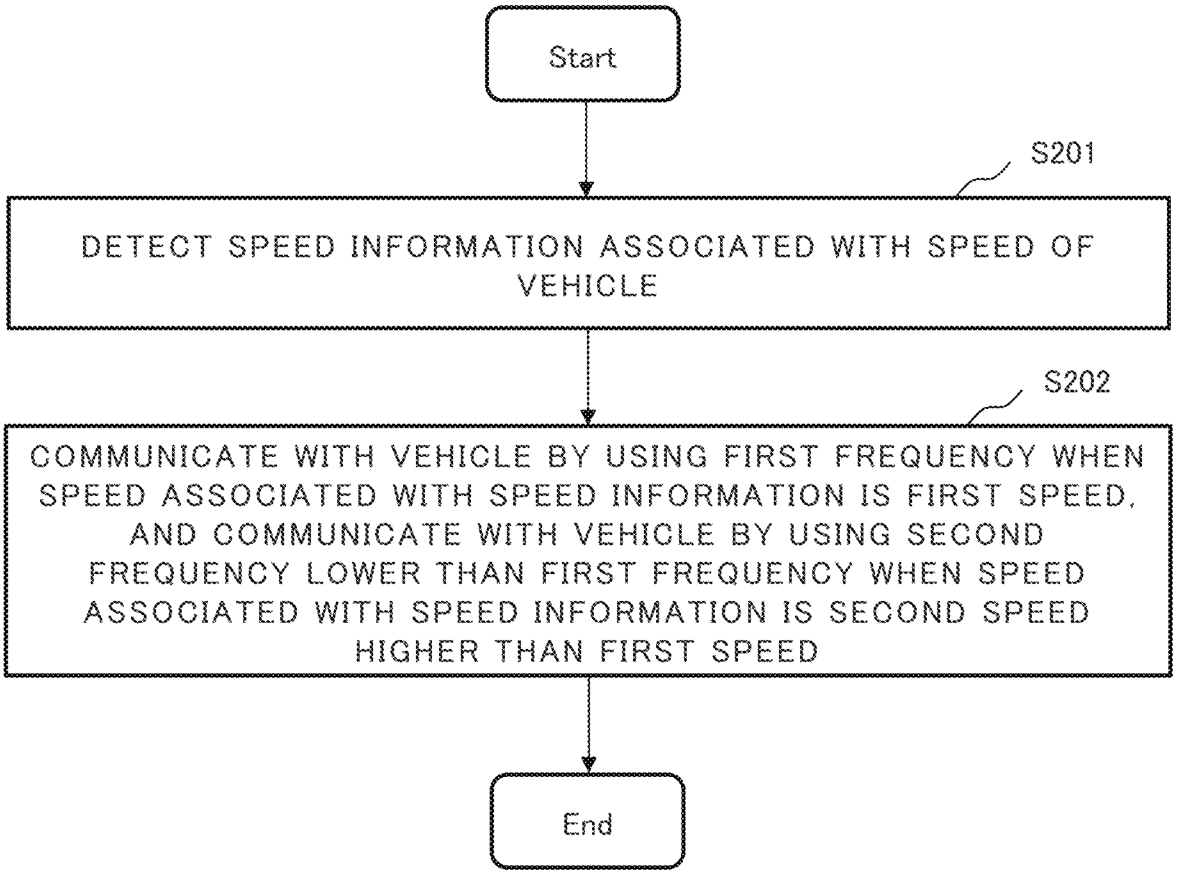
FIG. 5 is a flowchart illustrating an operation example of the communication system according to the second example embodiment of the present invention.

A communication system 2 according to a second example embodiment will be described by using FIGS. 4 and 5. FIG. 4 is a block diagram illustrating a configuration example of the communication system 2. FIG. 5 is a flowchart illustrating an operation example of the communication system 2.

As illustrated in FIG. 4, the communication system 2 includes a communication means 21 and a detection means 22. Note that, the communication means 21 and the detection means 22 of the communication system 2 may have a function and a connection relationship similar to the communication means 21 and the detection means 22 of the communication system 1.

The communication means 21 communicates with an unillustrated vehicle. The detection means 22 detects speed information associated with a speed of the vehicle. Based on the speed information, the communication means 21 communicates with the vehicle by using a first frequency when a speed of the vehicle is a first speed. Further, the communication means 21 communicates with the vehicle by using a second frequency lower than the first frequency when a speed of the vehicle is a second speed higher than the first speed.

Note that, the detection means 22 detects speed information associated with a speed of the vehicle, for example, by communicating with the vehicle. Further, the detection means 22 may acquire, from a traffic signal giving an instruction to the vehicle, speed information associated with the instruction. Further, the detection means 22 may acquire speed information, based on a video of the vehicle imaged by an externally provided imaging means. Further, the detection means 22 may acquire speed information, based on location information of the vehicle 10 acquired by a GPS or a GNSS.

Next, an operation example of the communication system 2 will be described by using FIG. 5.

The detection means 22 detects speed information associated with a speed of a vehicle (S201). The communication means 21 communicates with the vehicle (S202). In the processing in S202, the communication means 21 communicates with the vehicle by using a first frequency when the speed associated with the speed information is a first speed. Further, the communication means 21 communicates with the vehicle by using a second frequency lower than the first frequency when the speed associated with the speed information is a second speed higher than the first speed. Note that, in the processing in S202, a frequency for use in communication with the vehicle is determined by the communication means 21, the detection means 22, or an unillustrated configuration. Note that, the second example embodiment is also for indicating a communication method including the processing in S201 and S202. Further, the second example embodiment is also for indicating a storage medium that stores a program causing an information processing device to execute the processing in S201 and S202.

As described above, in the communication system 2, based on speed information, the communication means 21 communicates with the vehicle by using a first frequency when a speed of the vehicle is a first speed. Further, the communication means 21 communicates with the vehicle by using a second frequency lower than the first frequency when a speed of the vehicle is a second speed higher than the first speed.

In order to perform a stable communication, a vehicle preferably travels within a range (cell) where a signal from a communication device can reach for a certain period of time, as described above. However, in a related technique, when a vehicle runs at a high speed, the vehicle moves through a plurality of cells for a short period of time, and thus, handover needs to be performed and the vehicle cannot perform a stable communication.

However, in the communication system 2, the vehicle running at a high speed can communicate by using a low-frequency radio signal that propagates over a wide cell. Thus, the communication system 2 can decrease frequency with which the vehicle moves between cells, and thus, the vehicle can perform a stable communication.

Figure 6:
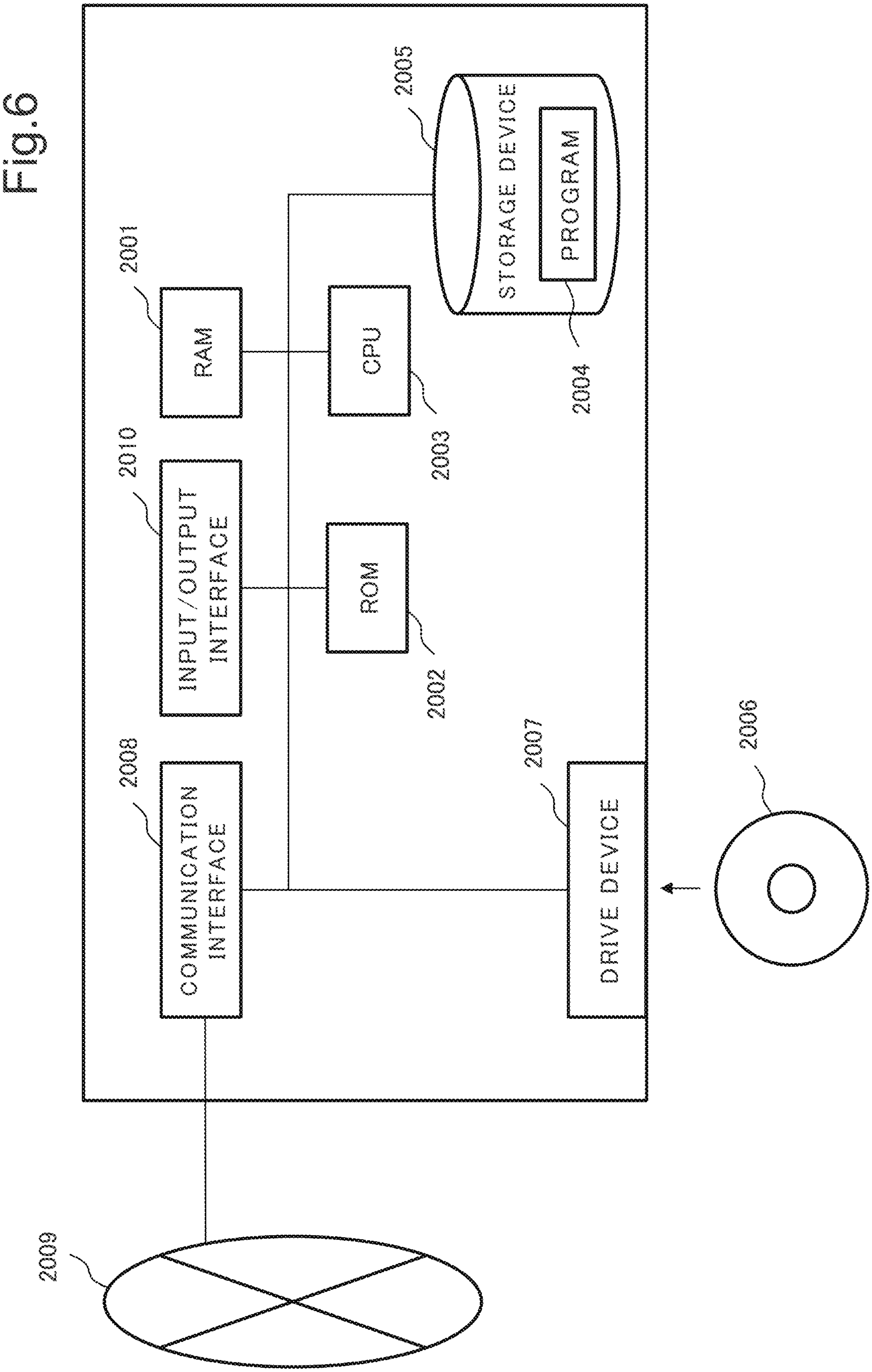
FIG. 6 is a diagram illustrating one example of an information processing device that achieves the communication systems and the like according to the first and second example embodiments of the present invention.

Further, some or all of components of each device or system are achieved by any combination of, for example, an information processing device 2000 as illustrated in FIG. 6 and a program. FIG. 6 is a diagram illustrating one example of an information processing device achieving the communication systems 1 and 2 or the like. As one example, the information processing device 2000 includes configurations as follows.

- a CPU 2001
- a read only memory (ROM) 2002
- a random access memory (RAM) 2003
- a program 2004 loaded on the RAM 2003
- a storage device 2005 storing the program 2004
- a drive device 2007 reading and writing from and to a recording medium 2006
- a communication interface 2008 connected to a communication network 2009
- an input/output interface 2010 inputting and outputting data
- a bus 2011 connecting each of the components Components of each device according to each of the example embodiments are implemented by acquiring and executing, by the CPU 2001, the program 2004 implementing functions thereof. The program 2004 implementing the functions of the components of each device is stored in, for example, the storage device 2005 or the RAM 2003 in advance, and is read by the CPU 2001 as needed. Note that, the program 2004 may be supplied to the CPU 2001 via the communication network 2009, or the program stored in the recording medium 2006 in advance may be read and supplied to the CPU 2001 by the drive device 2007.

There are various modified examples of a method of achieving each device. For example, each device may be achieved by any combination of the information processing device 2000 and a program individually different for each component. Further, a plurality of components included in each device may be achieved by any combination of one information processing device 2000 and a program.

Further, some or all of components of each device are achieved by a general-purpose or dedicated circuitry including a processor or the like, or by a combination thereof. These may be configured by a single chip, or may be configured by a plurality of chips connected via a bus. Some or all of components of each device may be achieved by a combination of the above-described circuitry or the like and a program.

When some or all of components of each device are achieved by a plurality of information processing devices, circuitries, or the like, the plurality of information processing devices, circuitries, or the like may be arranged in a concentrated way, or may be arranged in a distributed way. For example, each of the information processing devices, circuitries, or the like may be achieved in a form of being connected via a communication network. Note that, examples of the communication network include, for example, a client and server system and a cloud computing system.

REFERENCE SIGNS LIST

1, 2 Communication system
10, 10A, 10B Vehicle
20 Communication device
21 Communication means
22 Detection means
23 Imaging means
24 Location information acquisition means
2001 CPU
2002 ROM
2003 RAM
2004 Program
2005 Storage device
2007 Drive device
2008 Communication interface
2009 Communication network
2010 Input/output interface
2011 Bus connecting each components

What is claimed is:

1. A communication system comprising:
a communication circuit configured to communicate with a vehicle; and
a detection circuit configured to detect speed information associated with a speed of the vehicle, wherein,
based on the speed information, the communication circuit
communicates with the vehicle by using a first frequency when the speed is a first speed, and
communicates with the vehicle by using a second frequency lower than the first frequency when the speed is a second speed higher than the first speed.

2. The communication system according to claim 1, wherein
the detection circuit acquires, from a traffic signal giving an instruction to the vehicle, the speed information associated with the instruction.

3. The communication system according to claim 1, further comprising
an imaging circuit configured to image the vehicle, wherein
the detection circuit acquires the speed information, based on a video of the vehicle imaged by the imaging circuit.

4. The communication system according to claim 1, further comprising
a location information acquisition circuit configured to acquire location information of the vehicle, wherein
the detection circuit acquires the speed information, based on the location information of the vehicle acquired by the location information acquisition circuit.

5. A communication method comprising:
detecting speed information associated with a speed of a vehicle;
communicating with the vehicle by using a first frequency when the speed based on the speed information is a first speed; and
communicating with the vehicle by using a second frequency lower than the first frequency when the speed based on the speed information is a second speed higher than the first speed.

6. A tangible and non-transitory storage medium storing a program causing an information processing device to execute:
processing of detecting speed information associated with a speed of a vehicle;
processing of communicating with the vehicle by using a first frequency when the speed based on the speed information is a first speed; and
processing of communicating with the vehicle by using a second frequency lower than the first frequency when the speed based on the speed information is a second speed higher than the first speed.

* * * * *